UNITED STATES PATENT OFFICE.

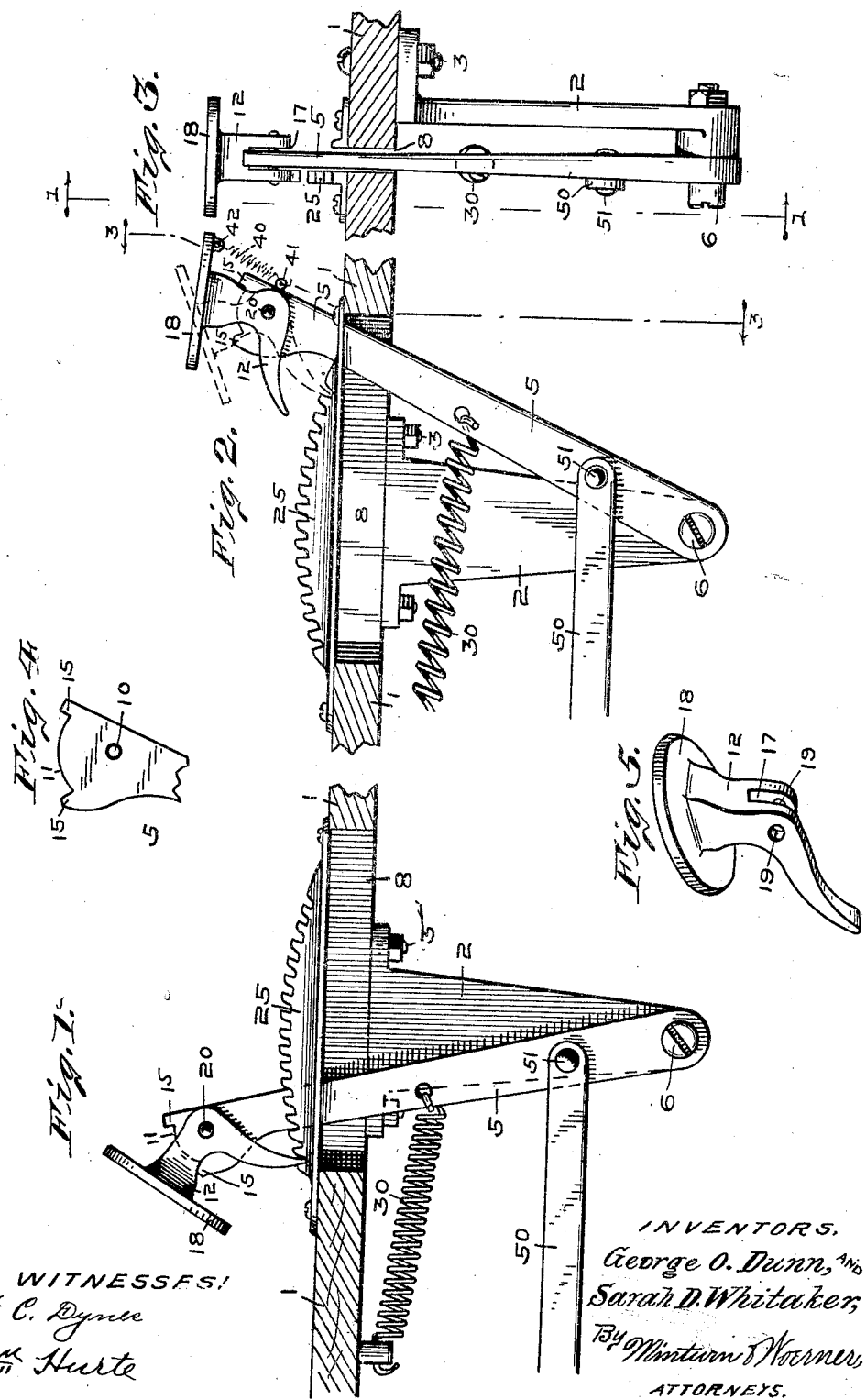

GEORGE O. DUNN AND SARAH D. WHITAKER, OF INDIANAPOLIS, INDIANA.

BRAKE-LEVER.

No. 836,640.   Specification of Letters Patent.   Patented Nov. 20, 1906.

Application filed January 2, 1906. Serial No. 294,309.

*To all whom it may concern:*

Be it known that we, GEORGE O. DUNN and SARAH D. WHITAKER, citizens of the United States, residing at Indianapolis, in the county of Marion and State of Indiana, have invented certain new and useful Improvements in Brake-Levers for Automobiles and Like Vehicles, of which the following is a specification.

This invention relates to a brake-lever for automobiles and like vehicles; and the object of the invention is to produce such a lever that will automatically catch on its forward movement, thus keeping the brake set, and when released the brake-lever will return to normal without employing a means to prevent the pawl engaging the rack.

We accomplish the object of our invention by the mechanism illustrated in the accompanying drawings, which are made a part hereof, and on which similar numerals of reference indicate similar parts.

Figure 1 is a side elevation of our improved brake-lever as seen from the dotted line 1 1 in Fig. 3. Fig. 2 is a view similar to Fig. 1, except that the lever is shown in its forward position. Fig. 3 is an end elevation of the construction shown in Fig. 2 as seen from the dotted line 3 3 in said figure. Fig. 4 is a fragmentary detail of the upper end of the brake-lever. Fig. 5 is a perspective view of the pawl.

In the drawings, 1 is the floor of vehicle. 2 is a standard for supporting the brake-lever and is secured to the floor 1 by means of the screw-bolts 3.

5 is the brake-lever that pivotally connects with the standard 2 by means of the bolt 6. The brake-lever 5 extends upward and parallel with the standard 2 and passes through a slot 8 in the floor 1 and into the interior of the vehicle. The brake-lever 5 near its upper end is provided with an aperture 10, that forms a bearing for the pawl 12. The brake-lever 5 has its upper end cut on an arc 11 which is concentric with the aperture 10 in the body. The pawl 12 is provided with the slot 17, into which the upper end of the brake-lever 5 extends. The pawl 12 has an aperture 19, that intersects the slot 17 and registers with the aperture 10 in the brake-lever 5. A pin 20 passes through the apertures 12 and 19, so that the pawl 12 will have movement independent of the brake-lever 5, and said movement of the pawl 12 is limited by means of the shoulders 15 at the ends of the arc 11. These shoulders are formed integrally with the brake-lever 5. The pawl 12 is also provided with the foot-plate 18, which has sufficient surface for the operator's foot in order to secure the necessary power for operating the device. The lower end of the pawl 12 engages a segmental rack 25, that is secured to the floor 1 in any suitable manner.

The brake-lever 5 normally stands in the position indicated in Fig. 1, thus indicating that the brake is out of operating position. When the operator applies his foot to the pawl 12, said pawl remains in contact with and rides over the teeth of the segment 25, so that if the foot is raised without changing the position of the pawl the latter will remain in engagement with the rack, and thus hold the tension at the point the foot is removed. To return the brake-lever 5 to normal when released, we provide the spring 30, having suitable strength, which is secured to the lever at one end and with the floor 1 with the other.

Fig. 2 shows the position of the brake-lever 5 when the brake is set to stop the vehicle, and in which position the brake is permitted to remain during the period of time the vehicle is resting. When it is desired to release the lever 5, the operator places his foot upon foot-plate 18 of the pawl 12, thus moving said pawl from the position shown by the dotted lines in Fig. 2 to the position shown by means of the full lines in said figure. This movement raises the pawl out of engagement with the segmental rack 25, and the full tension of the spring 30 is now applied against the operator's foot. The operator now releases the pawl 12 and lever 5 without changing the position of the pawl, and the added strength of the spring 30 through its expansion quickly draws the lever 5 back to normal before the pawl 12 can reëngage the rack 25. The impact of the lever at the terminus of its movement is sufficient to throw the pawl 12 into engagement with the segmental rack 25. The construction as shown is most simple and desirable. However, should it be desired to positively hold the pawl out of engagement with the rack 25 when the brake is in its resting position a spring 40 could be employed, which would engage the eye 41 in the lever 5 and a similar eye 42 in the pawl 12. (See Fig. 2.) The spring 40 would have only sufficient strength to hold the pawl out of contact with the rack, but would in no way interfere with said pawl when the latter engaged the rack, for the reason in the latter instance the spring 30 would be applying great pressure, and through the positioning of the parts the tendency of the pawl 12 would be to move down into the teeth of the rack 25.

A rod 50 pivotally connects with the brake-lever 5 by means of the pivot 51 and extends to and engages with and operates the brake mechanism. (Not shown.)

Having thus fully described our said invention, what we desire to secure by Letters Patent is—

1. In a device of the character described comprising the brake-lever, means for pivotally mounting said lever, a pawl mounted on said lever and susceptible to movement independently of said lever, means on the lever for limiting the independent movement of the pawl, a catch device mounted independently of said pawl to engage the latter, and a tension device for the lever for returning it to normal position.

2. In a device of the character described comprising the brake-lever, means for pivotally mounting said lever, a pawl mounted on said lever and susceptible to movement independently of said lever, means on the lever for limiting the independent movement of the pawl, means for holding the pawl in a given position when idle, a catch device mounted independently of said pawl to engage the latter, and a tension device to return the said lever to normal.

In witness whereof we have hereunto set our hands and seals, at Indianapolis, Indiana, this 13th day of December, A. D. 1905.

GEORGE O. DUNN. [L. S.]
SARAH D. WHITAKER. [L. S.]

Witnesses:
F. W. WOERNER,
J. A. MINTURN.